US011272686B2

(12) United States Patent
Lomis

(10) Patent No.: US 11,272,686 B2
(45) Date of Patent: Mar. 15, 2022

(54) MODULAR ANIMAL ACCOMMODATION

(71) Applicant: BigCity Design Pty Ltd, Hornsby (AU)

(72) Inventor: Dimitra Lomis, Hornsby (AU)

(73) Assignee: BigCity Design Pty Ltd, Hornsby (AU)

( * ) Notice: Subject to any disclaimer, the term of this patent is extended or adjusted under 35 U.S.C. 154(b) by 6 days.

(21) Appl. No.: 15/573,741

(22) PCT Filed: May 11, 2015

(86) PCT No.: PCT/AU2015/050231
§ 371 (c)(1),
(2) Date: Nov. 13, 2017

(87) PCT Pub. No.: WO2016/179626
PCT Pub. Date: Nov. 17, 2016

(65) Prior Publication Data
US 2018/0139924 A1 May 24, 2018

(51) Int. Cl.
*A01K 1/03* (2006.01)
(52) U.S. Cl.
CPC .................................. *A01K 1/033* (2013.01)
(58) Field of Classification Search
CPC ........... A01K 1/03; A01K 1/031; A01K 1/033
See application file for complete search history.

(56) References Cited

U.S. PATENT DOCUMENTS 3,919,978 A * 11/1975 Schaefer ................ A01K 1/031
119/500
3,924,571 A 12/1975 Holman
4,249,482 A * 2/1981 Harr ...................... A01K 1/031
119/419
4,402,280 A 9/1983 Thomas
4,528,941 A 7/1985 Spengler
4,989,545 A * 2/1991 Sheaffer ................. A01K 1/031
119/419
5,000,120 A * 3/1991 Coiro, Sr. .............. A01K 1/031
119/419

(Continued)

FOREIGN PATENT DOCUMENTS

JP       2009225750 A    10/2009
WO    2005089536 A1     9/2005

OTHER PUBLICATIONS

IPR, ISR and Written Opinion for PCT/AU2015/050231, completed Aug. 2, 2017 / dated Jul. 6, 2015, 13 pgs.

*Primary Examiner* — Lisa L Tsang
(74) *Attorney, Agent, or Firm* — Greenberg Traurig, LLP

(57) ABSTRACT

An animal accommodation facility includes a number of substantially airtight enclosures. Each enclosure includes at least one air inlet and at least one air outlet. The animal accommodation facility further includes an air delivery system which draws air from the atmosphere and an air exhaust system which exhausts air to the atmosphere. The air delivery system delivers air to the at least one air inlet of each enclosure and the air exhaust system receives air from the at least one air outlet of each enclosure. The air delivery system further includes a number of air delivery conduits and at least one air delivery conduit is dedicated to each enclosure. The air exhaust system further includes a number of air exhaust conduits and at least one air exhaust conduit is dedicated to each enclosure.

7 Claims, 4 Drawing Sheets

(56) References Cited

U.S. PATENT DOCUMENTS

| | | | | |
|---|---|---|---|---|
| 5,042,429 A * | 8/1991 | Deitrich | A01K 1/031 | 119/419 |
| 5,048,459 A * | 9/1991 | Niki | A01K 1/031 | 119/418 |
| 5,213,059 A * | 5/1993 | Krantz | A61D 7/04 | 119/419 |
| 5,220,882 A * | 6/1993 | Jenkins | A01K 1/03 | 119/420 |
| 5,247,901 A * | 9/1993 | Landon | A01K 1/031 | 119/417 |
| D399,609 S * | 10/1998 | Allen | D30/108 | |
| 5,996,535 A * | 12/1999 | Semenuk | A01K 1/031 | 119/456 |
| 6,308,660 B1 | 10/2001 | Coiro, Sr. et al. | | |
| 6,810,833 B2 * | 11/2004 | Bonner | A01K 1/03 | 119/452 |
| 7,036,457 B2 * | 5/2006 | Uchiyama | A01K 1/031 | 119/419 |
| 7,320,294 B2 * | 1/2008 | Irwin | A01K 1/031 | 119/417 |
| 7,363,879 B2 * | 4/2008 | Bonner | A01K 1/0035 | 119/417 |
| 7,798,171 B2 * | 9/2010 | Gabriel | A01K 1/031 | 137/614.04 |
| 7,874,267 B2 * | 1/2011 | Oshima | A01K 1/01 | 119/302 |
| 8,047,160 B2 * | 11/2011 | Tamborini | A01K 1/031 | 119/417 |
| 8,689,739 B2 * | 4/2014 | Owens | A01K 1/03 | 119/455 |
| 9,155,283 B2 * | 10/2015 | Conger | A01K 1/031 | |
| 2006/0011143 A1 * | 1/2006 | Drummond | A01K 1/031 | 119/420 |
| 2006/0254528 A1 * | 11/2006 | Malnati | A01K 1/031 | 119/419 |
| 2007/0193527 A1 | 8/2007 | Verhage et al. | | |
| 2010/0116765 A1 * | 5/2010 | Gabriel | A01K 1/031 | 211/189 |
| 2015/0201581 A1 * | 7/2015 | Semenuk | A01K 1/031 | 119/418 |
| 2015/0334986 A1 * | 11/2015 | Loyd | A01K 1/031 | 119/418 |

\* cited by examiner

MODULAR ANIMAL ACCOMMODATION

CROSS REFERENCE TO RELATED APPLICATION

This application is a § 371 national stage application claiming priority from International Application No. PCT/AU2015/050231, filed May 11, 2015, entitled "Modular Animal Accommodation" and incorporated herein by reference in its entirety.

TECHNICAL FIELD

The present invention relates to a modular animal accommodation facility and is particularly concerned with a modular animal accommodation facility for temporary boarding of domestic cats.

BACKGROUND TO THE INVENTION

Animal owners have long regarded their domestic animals as members of their family rather than mere commodities. Numerous legal systems have acknowledged the growing importance of domestic animals in family life by elevating their status to "companion animals" and providing minimum standards for their protection.

The present invention was borne from the recognition that animals are sentient creatures, both in terms of the sensory (smell, touch, see and hear) and perceptive (feel pain and experience suffering) aspects of that term. With this in mind, the present invention applies zoometrics and advanced animal welfare principles to provide a comfortable and safe accommodation system that meets the unique behavioural, physical, psychological and welfare requirements of animals in out-of-home environments such as boarding facilities or veterinary practices.

The present invention relates to companion animal enclosures and specifically to modular enclosures that provide humane, comfortable, safe and sanitary accommodation for companion animals such as cats. The invention also provides an enriched, stimulating environment that meets cats' instinctive needs.

Animal owners who are away from home for a period of time increasingly arrange for their companion animals to be housed at boarding premises—kennels for dogs and catteries for cats. Boarding premises operators provide a variety of enclosure types in which companion animals are housed during their stay. For cats, enclosures are typically cages which are open to the environmental conditions at the boarding premises; cages are typically constructed from metal and/or organic substrates.

A stay at boarding premises can be traumatic for cats because cats:
- are highly reliant on their sense of smell;
- are territorial and generally solitary (ie, not pack) animals;
- experience increased stress in unfamiliar environments (stress has been identified as a trigger for developing illnesses such as urinary tract infection);
- may exhibit aggressive behaviour in the presence of unknown cats; and
- are susceptible to airborne contagions (cat sneeze can travel approximately 900 mm to 1.2 metres, thereby propelling contagions into an open environment facilitating the spread to nearby cats).

The same factors apply when cats are admitted to a veterinary clinic. In addition, by its nature, the environment at a veterinary clinic is one that includes the concurrent treatment of multiple species of animals for a variety of conditions, illnesses and traumas. In that context, there is a need to minimise the risk of cross-contamination that may arise from:
- housing multiple species within the same area;
- the likely existence of various contagions from the myriad of illnesses and conditions being treated; and
- intensified use of the clinic during peak periods.

There remains a need for improved animal accommodation systems and facilities.

SUMMARY OF THE INVENTION

In a first aspect the present invention provides an animal accommodation facility including: a number of substantially airtight enclosures; each enclosure having at least one air inlet and at least one air outlet; an air delivery system which draws air from the atmosphere; an air exhaust system which exhausts air to the atmosphere; wherein the air delivery system delivers air to the at least one air inlet of each enclosure; and the air exhaust system receives air from the at least one air outlet of each enclosure; wherein the air delivery system includes a number of air delivery conduits and at least one air delivery conduit is dedicated to each enclosure; and wherein the air exhaust system includes a number of air exhaust conduits and at least one air exhaust conduit is dedicated to each enclosure.

Each enclosure may have at least two air inlets.
Each enclosure may have at least two air outlets.
The enclosures may be provided as modules.
The air delivery conduits and air exhaust conduits may be provided with removable regions which allow like conduits to be installed in different configurations in the facility.
The modules may each include a drawer for collecting fluids from the enclosure.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Figure 1:
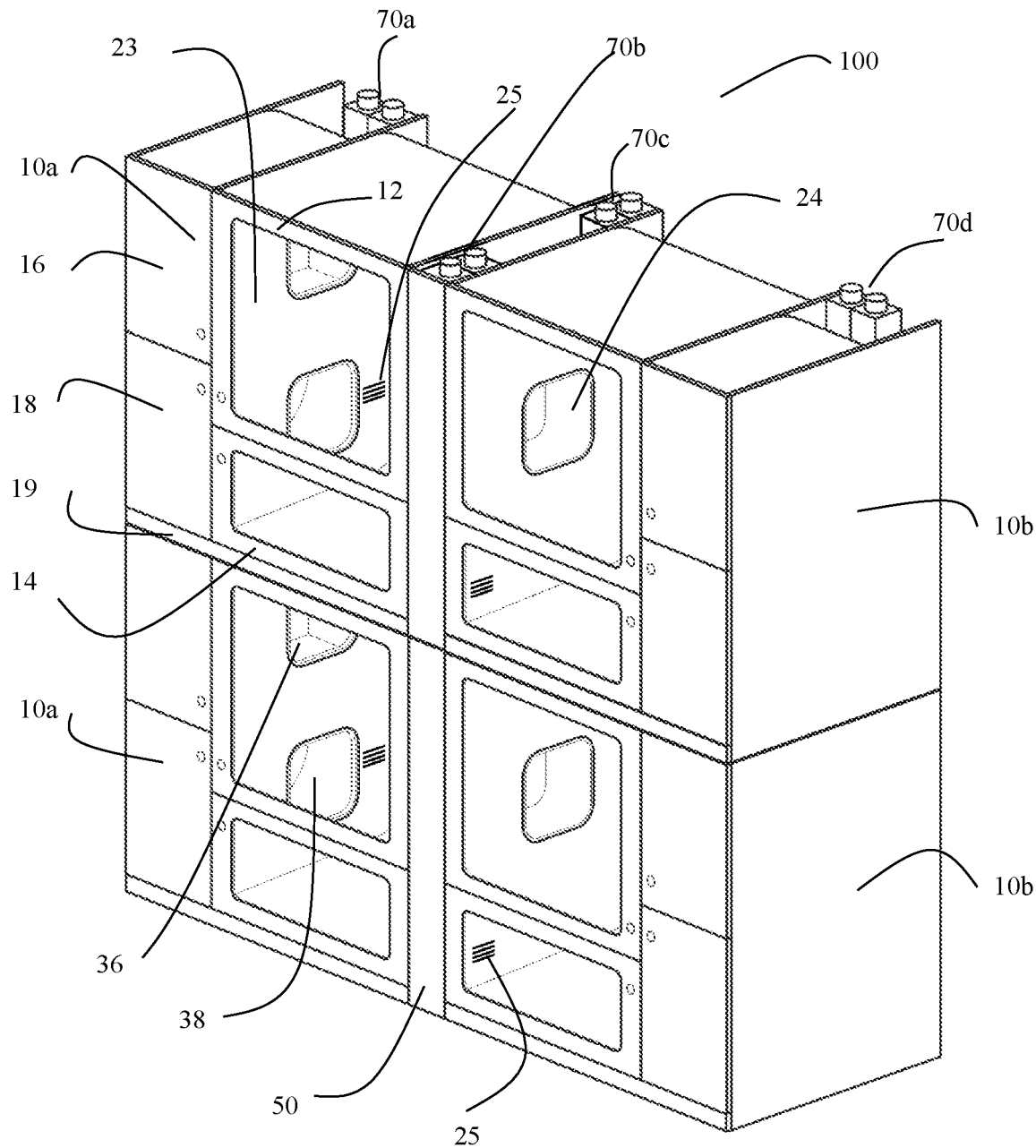
FIG. 1 is a perspective view of an animal accommodation facility.

Referring to FIG. 1, an accommodation installation 100 for an animal accommodation facility intended for housing domestic cats is shown including four enclosure modules 10a, 10b. Pairs of modules 10a, 10b are mounted one atop the other. Each pair of modules is mounted on either side of a service riser 50. The installation is ideally installed along an internal wall of a room or building. The combined height of two modules 10a, 10b is of a similar height to 1.5 people. Modules 10a and 10b differ in that module 10b is generally a reverse configuration of module 10a. They are configured as left and right hand versions.

Each module 10a, 10b has hinged doors mounted on its front face. Doors 12, 14 have clear window portions and allow access to general living areas. Doors 16 and 18 are opaque and allow access to sleeping 16 and litter 18 areas. The general living areas are separated from the sleeping and litter areas by way of a dividing wall 23. A cat in the enclosure 10 may access the litter area by way of aperture 38 in the dividing wall 23 and access the sleeping area by way of aperture 36 in the dividing wall 23.

An access aperture 24 is provided to allow an animal to move between adjacent modules 10a, 10b. The access aperture 24 may be obstructed with a sliding cover as required. When the aperture is open then this will allow more room for one animal to move about, or can be used if more than one animal is to be housed in the facility which are familiar with one another, such as household pets from the same household.

A horizontal shelf (not visible) is located at the location of the join between doors 16, 18 and separates the sleeping 16 and litter areas. In the general living area behind doors 12, 14 various shelf configurations can be provided to give an animal a variety of locations to explore and inhabit in the enclosure.

With doors and drawer closed the modules are substantially airtight. Air is delivered and removed from the modules by a series of air vents 25. Each module 10a, 10b includes five air vents 25 (some of which are visible in FIG. 1) which cooperate with an air delivery system including air delivery conduits in the form of inlet ducts 70b, 70c and air exhaust conduits in the form of outlet ducts 70a, 70d the top openings of the ducts are visible emanating from the top of the facility 100.

Figure 2:
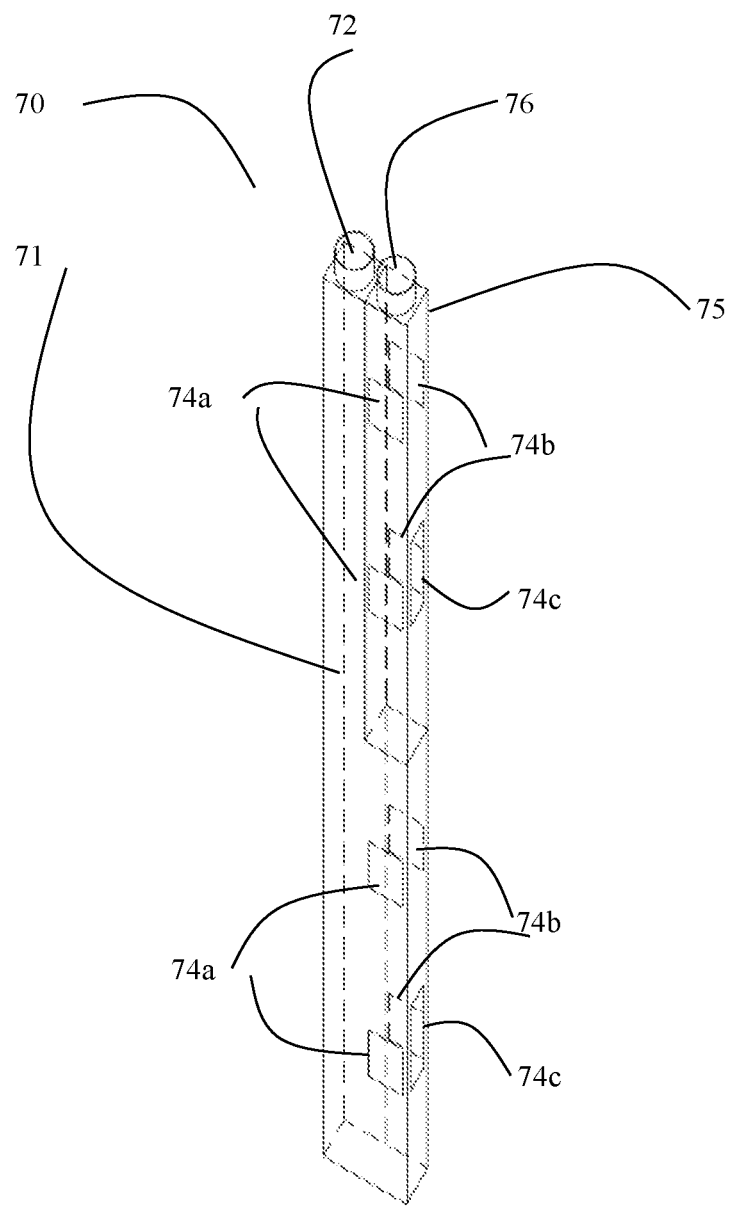
FIG. 2 is a perspective view of a universal duct used in the installation of the facility of FIG. 1.
Figure 3:
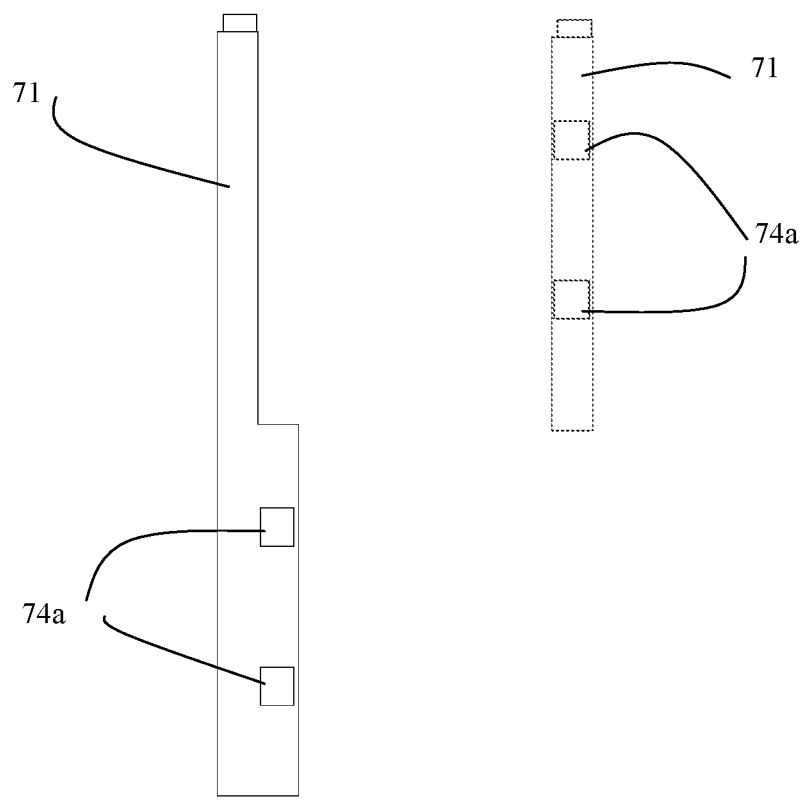
FIG. 3 is a front exploded view of the universal duct of FIG. 2.

Referring to FIGS. 2 and 3, the air delivery ducts 70a, 70d and air exhaust ducts 70b, 70c are both provided by way of universal duct 70. Duct 70 is provided in two sections 71, 75 which are nested together when installed. Section 71 services the lower modules in a facility and is approximately the same height as two modules stacked on top of one another. Section 75 services the upper modules in a facility and is approximately the height of one module 10. Preferably, both of sections 71 and 75 are blow-moulded from PVC. Section 71 is somewhat L-shaped and is twice the width of section 75 in its lower half. Section 75 sits in section 71. Section 71 may be formed in upper and lower halves which are then joined together in an airtight fashion.

Both of sections 71 and 75 each have five removable panels 74 being two front panels 74a, two rear panels 74b and one side panel 74c. Depressions or outlines indicate the presence of the removable panels 74 which are cut out of each section at the time of installation according to the location of the duct 70 in the facility to cooperate with air vents 25 in the modules 10. When installed for air delivery two panels are removed, being either the two front panels 74a or the two rear panels 74b. When installed for air exhaust three panels are removed, being the side panel 74c in addition to either the two front panels 74a or the two rear panels 74b. At the time of installation the region around each removed cut-out panel is fitted with a self-adhesive foam gasket which is adhered to a module so that the opening overlies an air vent to create an airtight joint between the module and the opening of the duct.

When installed, duct 70 is used to convey air to or from a module and into or out of upper openings 72, 76. Importantly, the removable panels 74 of section 75 are provided in the same pattern as the panels 74 of section 75. Furthermore, when the sections 71 and 75 are nested together their respective removable panels 74 are vertically aligned. As will become apparent, this allows for upper and lower modules in a pair of modules to be of identical construction, whilst still allowing for separate air delivery and exhaust from each module using a series of identical ducts 70.

Figure 4:
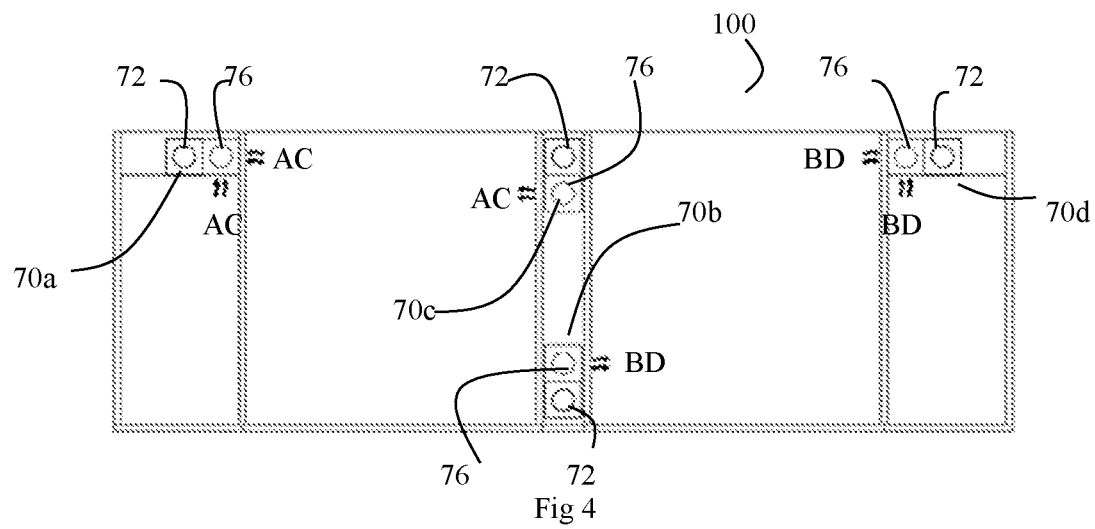
FIG. 4 is a schematic plan view illustrating the flow of air in the facility of FIG. 1.
Figure 5:
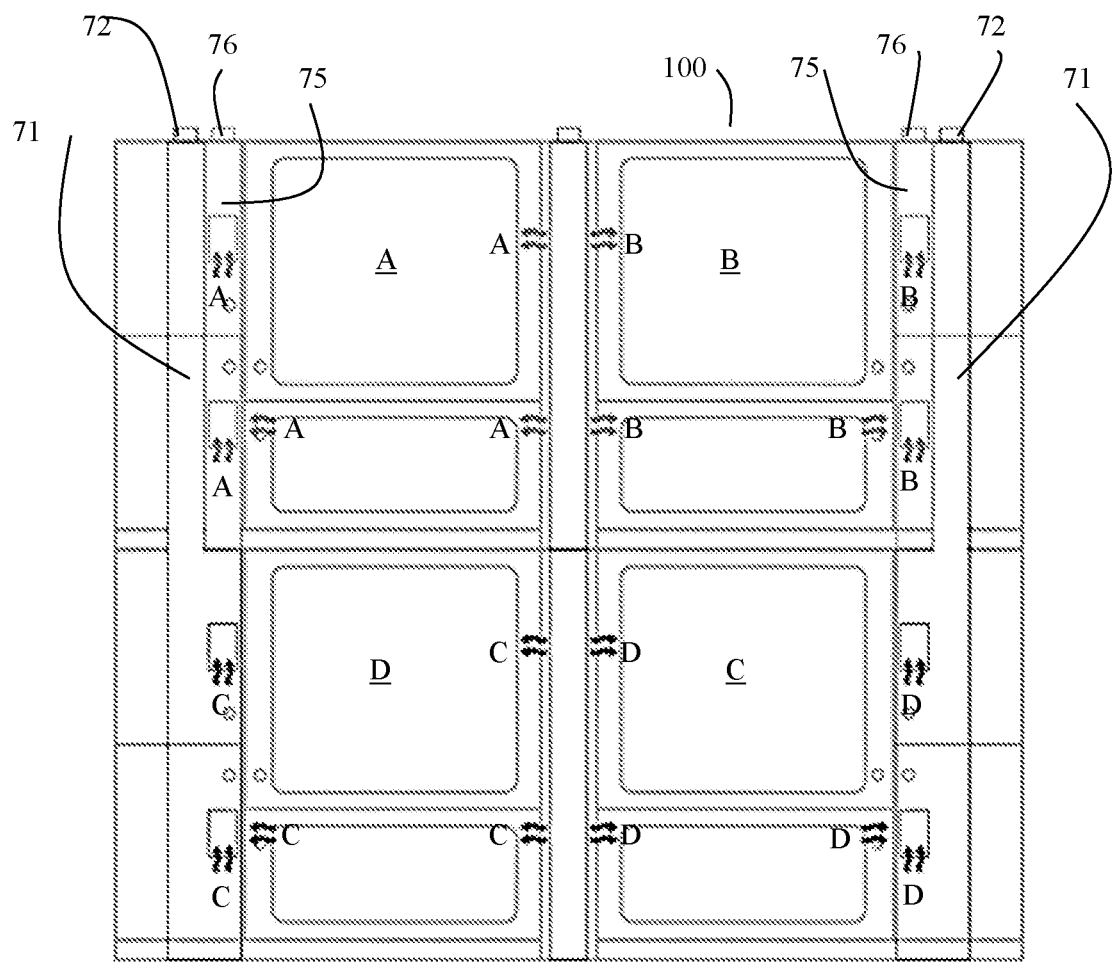
FIG. 5 is a schematic front view illustrating the flow of air in the facility of FIG. 1.

Referring to FIGS. 4 and 5, the segregated airflow through the modules by way of the ducts 70 is illustrated. In these figures, the arrows A, B, C and D are used to indicate the airflow into and out of each of four modules A, B, C, D in the facility 100.

Ducts 70c and 70b housed in the service riser 50 and both sections 71 and 75 of these ducts operate as air delivery conduits. The upper openings 72, 76 of these ducts are plumbed to a fresh air supply drawn from the atmosphere which is delivered into the ducts at a controlled slightly positive pressure by way of a blower or fan or the like. Each of the sections 71 and 75 of these ducts delivers air to modules through two openings in the duct formed by removing panels which coincide with two air vents provided on each module to deliver air into the general living area of the module at an upper region and a lower region.

Ducts 70a and 70d are housed to the rear of the sleeping and litter areas of the modules and both sections 71 and 75 of ducts 70a, 70d operate as air exhaust conduits. The upper openings 72, 76 of these ducts are plumbed to exhaust ductwork which leads the exhaust air away to the atmosphere outside the building. One or more fans or blowers or the like are provided in the exhaust ductwork to draw air away from the enclosures. Each of the sections 71 and 75 of ducts 70a, 70d draw air from modules through three openings in the duct formed by removing panels which coincide with three air vents provided on each module to draw air from the general living area of the module at a lower region, from the sleeping area 16 and from the litter area 18.

The configuration of ducts 70 to deliver and exhaust air from each module is as specified in the table below:

| Module | Air delivery | Air exhaust |
|---|---|---|
| A | Section 75 of duct 70c | Section 75 of duct 70a |
| B | Section 75 of duct 70b | Section 75 of duct 70d |
| C | Section 71 of duct 70c | Section 71 of duct 70a |
| D | Section 71 of duct 70b | Section 71 of duct 70d |

In each case, the longer duct sections 71 service the lower modules D, C and the shorter duct sections 75 service the upper modules A, B.

Air is delivered into each module at two vents. This provides an important safety measure in case one vent is inadvertently blocked by an object such as a blanket or sleeping animal. In case one vent is obstructed, air is still able to enter the module to maintain adequate levels of oxygen to sustain the animal inside the module.

Extraction is provided from each room in the module— litter area, sleeping area and main living areas. This allows for improved odour control. Cats will not use a litter that smells or is unpleasant. Similarly, they do not like to toilet where they sleep or eat. This feature allows the cat to have separate zones for eating, sleeping and toileting. These zones benefit from cross-ventilation of clean air, keeping every room odour free.

The installation minimises cats' exposure to other tenants and reduces the likelihood of cross-contamination by isolating the delivery and expulsion of air and other services to each enclosure.

Modules 10 are constructed from inorganic substrates (anti-microbial and non-allergenic) such as a fibreglass reinforced moulded plastic that inhibit contagion growth. The floor of the living area and the litter area 18 is inclined at an angle of 2 degrees towards the front of each module. This causes any liquid on the floor of the module to flow internally into removable drawer 19.

Embodiments of the air-flow system:
- provides air supply to individual enclosures by a mechanical air supply unit;
- provides air extraction from individual enclosures by an extraction fan unit;
- services each enclosure individually and does not traverse either an adjoining enclosure or a common external area;
- does not rely on recirculated air within the premises in which enclosures are installed;
- delivers conditioned, filtered, temperature-controlled fresh air directly into each enclosure;
- extracts return air directly from each compartment within each enclosure (thereby preventing odours circulating between compartments within each enclosure);
- moves air within each enclosure by active air delivery into the enclosure and active air extraction from the enclosure;
- utilises a compact segregated universal duct arrangement within the footprint of each enclosure that increases the distance of separation between enclosures (effectively creating a physical separation that is at least 3 times the distance that cat sneeze can travel); and
- in the event of a mechanical unit failure, fails open thus providing fresh air movement through each enclosure at all times (effectively the physical separation of animals is not breached in the event of a mechanical unit failure).

Embodiments of the invention enable animal care professionals to provide humane, comfortable, safe and sanitary accommodation for cats during all their life stages (from kittens requiring specialised care to cats with disability (such as blindness, deafness and limited mobility) and geriatric cats) without compromising the health and welfare of any other cats in their care.

Embodiments of the invention provide animal care professionals significantly improved ability to care for cats to a standard not currently available. The invention relates to both physical separation between each animal as well as air segregation as the combined means of eliminating the movement of airborne contagions and creating a comfortable environment conducive to welfare-based outcomes.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

I claim:

1. An animal accommodation facility including:
   a number of substantially airtight enclosures;
   each of the enclosures having at least one air inlet and at least one air outlet;
   an air delivery system which draws air from the atmosphere;
   an air exhaust system which exhausts air to the atmosphere;
   the air delivery system includes a number of air delivery conduits which deliver air at positive pressure to the at least one air inlet of each of the enclosures; and
   the air exhaust system includes a number of air exhaust conduits which receive air from the at least one air outlet of each of the enclosures;
   wherein at least one of the number of air delivery conduits is dedicated to each of the enclosures;
   wherein at least one of the number of air exhaust conduits is dedicated to each of the enclosures;
   wherein each of the dedicated air delivery conduits and each of the dedicated air exhaust conduits are of a length which is at least the height of each of the enclosures;
   wherein each of the dedicated air delivery conduits and each of the dedicated air exhaust conduits are of a length which results in the distance that air must move along the conduits to travel from one enclosure to another to be at least 2.7 meters; and
   each of the enclosures has a hinged door mounted on its front face which is substantially airtight when in a closed condition, and the door allows the introduction and removal of an animal to or from the module.

2. The accommodation facility according to claim 1 wherein each of the enclosures has at least two air inlets.

3. The accommodation facility according to claim 1 wherein each of the enclosures has at least two air outlets.

4. The accommodation facility according to claim 1 wherein each of the enclosures is provided as a module.

5. The accommodation facility according to claim 1 wherein the number of air delivery conduits and the number of air exhaust conduits are provided with removable regions which allow like conduits to be installed in different configurations.

6. The accommodation facility according to claim 1 wherein each of the enclosures comprises an associated drawer for collecting fluids from the enclosure.

7. The accommodation facility according to claim 1 wherein the air delivery system further includes at least one blower or fan that is configured to deliver air into the number of air delivery conduits at the positive pressure.

* * * * *